US012350691B2

(12) United States Patent
Lu

(10) Patent No.: US 12,350,691 B2
(45) Date of Patent: Jul. 8, 2025

(54) BOTTOM-FILLABLE SPRAY BOTTLE

(71) Applicant: Le Lu, Yuyao (CN)

(72) Inventor: Le Lu, Yuyao (CN)

( * ) Notice: Subject to any disclaimer, the term of this patent is extended or adjusted under 35 U.S.C. 154(b) by 174 days.

(21) Appl. No.: 18/361,570

(22) Filed: Jul. 28, 2023

(65) Prior Publication Data

US 2024/0181480 A1 Jun. 6, 2024

(30) Foreign Application Priority Data

Dec. 2, 2022 (CN) ......................... 202223238316.3
Dec. 2, 2022 (CN) ......................... 202223254037.6
Jan. 18, 2023 (CN) ......................... 202320224752.0

(51) Int. Cl.
*B05B 11/00* (2023.01)

(52) U.S. Cl.
CPC ...... *B05B 11/0056* (2013.01); *B05B 11/0035* (2013.01)

(58) Field of Classification Search
CPC ........................ B05B 11/0056; B05B 11/0035
See application file for complete search history.

(56) References Cited

U.S. PATENT DOCUMENTS 5,791,527 A * 8/1998 Giuffredi ............ B05B 11/0037 222/525
5,865,350 A * 2/1999 Losenno ................ B65D 83/62 222/105
2012/0090730 A1* 4/2012 Dumont .............. B05B 11/0044 141/2
2012/0312843 A1* 12/2012 Dumont .............. B05B 11/0056 222/321.9
2013/0019991 A1* 1/2013 Muller ................ B05B 11/0056 222/321.9
2013/0306681 A1* 11/2013 Muller ................ B05B 11/1059 222/321.9
2017/0043365 A1* 2/2017 Hui ....................... B05B 11/029
2024/0181480 A1* 6/2024 Lu ....................... B05B 11/0035

FOREIGN PATENT DOCUMENTS

CN 100488641 C * 5/2009 ....... B05B 11/00418

* cited by examiner

*Primary Examiner* — Bob Zadeh
(74) *Attorney, Agent, or Firm* — Schwegman Lundberg & Woessner, P.A.

(57) ABSTRACT

A bottom-fillable spray bottle is provided, it includes a bottle body, a liquid spraying assembly, a vent assembly and a liquid injection assembly. The liquid injection assembly includes a liquid inlet nozzle and a bayonet. The liquid injection assembly is arranged at an opening of a bottle bottom, and the bayonet can releasably seal the opening. The bayonet is provided with a first and a third liquid inlet channel. When pushing a part of the bayonet into the opening so that the third liquid inlet channel enters the opening and enables the third liquid inlet channel to be above the opening, the channels and the accommodating cavity are communicated with each other, and when the bayonet seals the opening, the third liquid inlet channel and the accommodating cavity are not communicated with each other. The ejector pin with a first sealing ring can releasably seal the bottle body.

10 Claims, 11 Drawing Sheets

BOTTOM-FILLABLE SPRAY BOTTLE

CROSS REFERENCE TO RELATED APPLICATION

This Non-provisional application claims priority under 35 U.S.C. § 119(a) to Chinese Patent Application No. 202223238316.3, filed on 2 Dec. 2022, and to Chinese Patent Application No. 202223254037.6, filed on 2 Dec. 2022, and to Chinese Patent Application No. 202320224752.0, filed on 18 Jan. 2023, the entire contents of each of which is hereby incorporated by reference in their entirety.

TECHNICAL FIELD

The disclosure relates to the technical field of packaging bottles, in particular to a bottom-fillable spray bottle.

BACKGROUND ART

At present, there are many kinds of spray bottle devices on the market, such as perfume bottles, but a structure of a spray bottle generally consists of a nozzle assembly, an inner bottle and an outer shell. For such spray bottles, it is impossible to replenish internal liquid after contents are used up, so this spray bottle can only be used once, resulting in a great waste of resources. If it is expanded so as to increase service time, this large-capacity spray bottle is not easy to carry.

For some of the sprayers, the nozzle assembly is arranged to be detachably connected with contents of the inner bottle. After the nozzle assembly is disassembled, the liquid is replenished into the inner bottle. However, a liquid replenishing process in this way can only be completed by dumping, which will cause liquid dripping and waste.

There are also some spray bottles which can be inflated at a bottom, with a complicated structure or less adaptability with solution storage bottles of different sizes or shapes, so other adapters are needed to realize liquid replenishment, there are also rebound sealing of some spray bottles that are not effective and often leak liquid.

SUMMARY

In order to overcome at least one shortcoming in related art, a bottom-inflatable spray bottle can be provided in this disclosure.

In order to achieve at least one of above objects, a bottom-fillable spray bottle is provided in this disclosure, which includes a bottle body, a liquid spraying assembly, a vent assembly and a liquid injection assembly mounted at a bottom of the bottle body. An accommodating cavity is provided in the bottle body, and the liquid spraying assembly is arranged on the bottle body for realizing liquid spraying of the spray bottle. The vent assembly includes a first sealing ring, an ejector pin and a first elastic member, a vent hole is provided near a top of the bottle body, and the first sealing ring for interference fit is arranged between the ejector pin and the bottle body. The liquid injection assembly includes a liquid inlet nozzle and a bayonet, the liquid injection assembly is arranged at an opening at a bottom of the bottle body, and the bayonet can releasably seal the opening, the bayonet is provided with a first liquid inlet channel, the liquid inlet nozzle is arranged at a bottom of the bayonet, the liquid inlet nozzle is provided with a second liquid inlet channel, and the bayonet is provided with a third liquid inlet channel communicated with the first liquid inlet channel. When the liquid inlet nozzle pushes a part of the bayonet into the opening so that the third liquid inlet channel enters the opening and enables the third liquid inlet channel to be above the opening, the first liquid inlet channel, the second liquid inlet channel, the third liquid inlet channel and the accommodating cavity are communicated with each other, and when the bayonet seals the opening, the third liquid inlet channel and the accommodating cavity are not communicated with each other. The bayonet is in sealing fit with an inner wall of the bottom of the bottle body, one end of the ejector pin is provided with the first elastic member, and the bayonet is connected with the other end of the ejector pin, so that movement of the bayonet drives the ejector pin to move, and thus the ejector pin with a first sealing ring can releasably seal the vent hole.

The accommodating cavity is configured for accommodating liquids such as perfume, and in use, liquid in the accommodating cavity can be sprayed out through the liquid spraying assembly only by pressing the liquid spraying assembly. If it is necessary to replenish the liquid in the accommodating cavity, it is required to operate the vent assembly and the liquid injection assembly together. If it is not vented, gas-liquid balance in the accommodating cavity is difficult to be broken, and even with the liquid injection assembly, the liquid is difficult to enter the accommodating cavity or very limited liquid enters the accommodating cavity. Therefore, it is necessary to vent the accommodating cavity during liquid injection, and provision of the vent assembly can greatly increase liquid intake.

A liquid injection process is as follows. A liquid outlet nozzle of a solution storage bottle is aligned with the liquid inlet nozzle and pressed upward, the liquid inlet nozzle pushes the bayonet to move upward, and the part of the bayonet pushes into the opening so that the opening is released. At this time, the third liquid inlet channel is pushed into the opening and above the opening. The liquid outlet nozzle of the solution storage bottle, the second liquid inlet channel of the liquid inlet nozzle, the first liquid inlet channel and the third liquid inlet channel of the bayonet and the accommodating cavity are communicated with each other, and under action of pressure difference between the accommodating cavity in the spray bottle and inside of the solution storage bottle, liquid in the solution storage bottle is transferred to the accommodating cavity, so as to realize the liquid replenishing. Meanwhile, in order to reduce pressure inside the accommodating cavity, the spray bottle in this disclosure is also provided with the vent assembly, which is linked with the liquid injection assembly. When the bayonet moves upward, the ejector pin of the vent assembly is also driven to move upward, thus driving the first sealing ring to move upward, and the first sealing ring is released from the vent hole and no longer seals the vent hole, so that the accommodating cavity is communicated with external environment, thus realizing vent function. When there is no need to inject liquid, the liquid inlet nozzle loses its upward force, and all structures are restored to their original positions under action of the ejector pin.

In order to solve a problem that the first sealing ring can automatically return to the vent hole and can seal the vent hole well, the first elastic member is further provided in this disclosure, and the ejector rod moves upward in venting, thus compressing the first elastic member. When the ejector pin loses its upward force, the first elastic element rebounds, thus pushing the ejector pin back to its original position to seal the vent hole. At this time, the bayonet can also be pushed back to its original position to further seal the opening.

Optionally, the bayonet includes a first part and a second part, and a second sealing ring groove for accommodating a second sealing ring is provided at an outer wall of an intersection of the first part and the second part. When the spray bottle is in a non-liquid-injecting state, the second sealing ring is in interference fit with the bayonet and the bottle body respectively; and when the spray bottle is in a liquid-injecting state, the liquid inlet nozzle pushes the bayonet into the opening so that the second sealing ring is not in contact with an inner wall of the bottle body.

Optionally, a third sealing ring groove for accommodating a third sealing ring is provided at an outer wall of the second part, and the second sealing ring is in interference fit with the bayonet and the bottle body respectively.

Optionally, shoulders matched with each other are respectively provided at an outer wall of the bayonet and an inner wall of the bottom of the bottle body, so that upward movement of the bayonet is limited, and the third sealing ring groove is arranged at a position lower than the shoulders.

Optionally, the first liquid inlet channel and the second liquid inlet channel are both axially arranged, the third liquid inlet channel is radially arranged, and the third liquid inlet channel is arranged between the second sealing ring and the third sealing ring. When the spray bottle is in the liquid-injecting state, the third liquid inlet channel is above the opening, so that the third liquid inlet channel is communicated with the accommodating cavity.

Optionally, the ejector pin is integral with a single structure circumferentially arranged around a central axis of the spray bottle, and the ejector pin is provided with a vent groove or a vent hole.

Optionally, the ejector pin includes an ejector pin body, and grooves for accommodating the first sealing rings are radially and sequentially provided at an end of the ejector pin body, so that the first sealing ring is in interference fit with the bottle body and the ejector pin respectively. The grooves and the first sealing rings are arranged in pairs, and both of them can be set as one or two or more. If two sealing rings are set to be thinner (as opposed to one single sealing ring), it will be easier for the ejector pin to rebound than if one sealing ring is set to be thicker. The sealing ring can optionally be an O-ring.

Optionally, a second groove for accommodating the first elastic member is provided at an upper end of the ejector pin body, so that an end of the ejector pin abuts against an end of the first elastic member. The bottom-fillable spray bottle further includes a lock, and the other end of the spring abuts against a lower end of a lock cover.

Optionally, a first groove for accommodating the first elastic member is provided at a bottom of the lock cover, and a limiting boss and rib are provided at two opposite sides of a bottom of the first groove for limiting at the two opposite sides of the first elastic member.

Optionally, the ejector pin further includes a mounting head, the ejector pin body is connected with the mounting head, and the bayonet is connected with the mounting head of the ejector pin, the bayonet is provided with a groove for accommodating the mounting head, and mutually matched engaging structures are respectively provided at engaging parts of the mounting head and the groove of the bayonet.

To sum up, when the bottom-fillable spray bottle according to the disclosure is operated, the liquid in the accommodating cavity can be sprayed out through the liquid spraying assembly only by pressing the liquid spraying assembly. The liquid can be replenished through the liquid injection assembly. Moreover, in order to increase liquid intake, the vent assembly is additionally arranged to vent the accommodating cavity, and the vent assembly and the liquid injection assembly are linked so that no additional operation is needed, and the vent function can be realized while the liquid is injected, with convenient operations. Further, in order to solve a problem that the ejector ping can automatically return to the vent hole and can seal the vent hole well, the first elastic member is further provided in this disclosure, and the ejector rod moves upward in venting, thus compressing the first elastic member. When the ejector pin loses its upward force, the first elastic element rebounds, thus pushing the ejector pin back to its original position to seal the vent hole.

Moreover, the vent assembly according to the disclosure is with a simpler structure and simpler assembly, and there is no need to provide a vent piston and there is no problem that the vent piston slips off from the ejector pin. Moreover, because the ejector pin and the inner wall of the bottle body are respectively arranged on both sides of the first sealing ring, the ejector pin can provide a pressure to the first sealing ring, thus improving sealing performance of the first sealing ring. The liquid injection assembly according to the disclosure is also with a simpler structure, there is no need to provide a liquid injection piston, with simpler assembly, and a sealing problem between the two structures of the liquid injection piston and the bayonet can be avoided, with better sealing effect.

DETAILED DESCRIPTION

In order to make the above and other objects, features and advantages of the utility model more obvious and understandable, a detailed description is made below for the preferred embodiments with reference to the accompanying drawings.

The elastic member mentioned below can be a spring, elastic plastic, a memory alloy, a sponge, a springboard and other components that can be deformed after a certain force is given, and can be restored to an original state after the force is removed and can give a reverse force.

Embodiment 1

Figure 1:
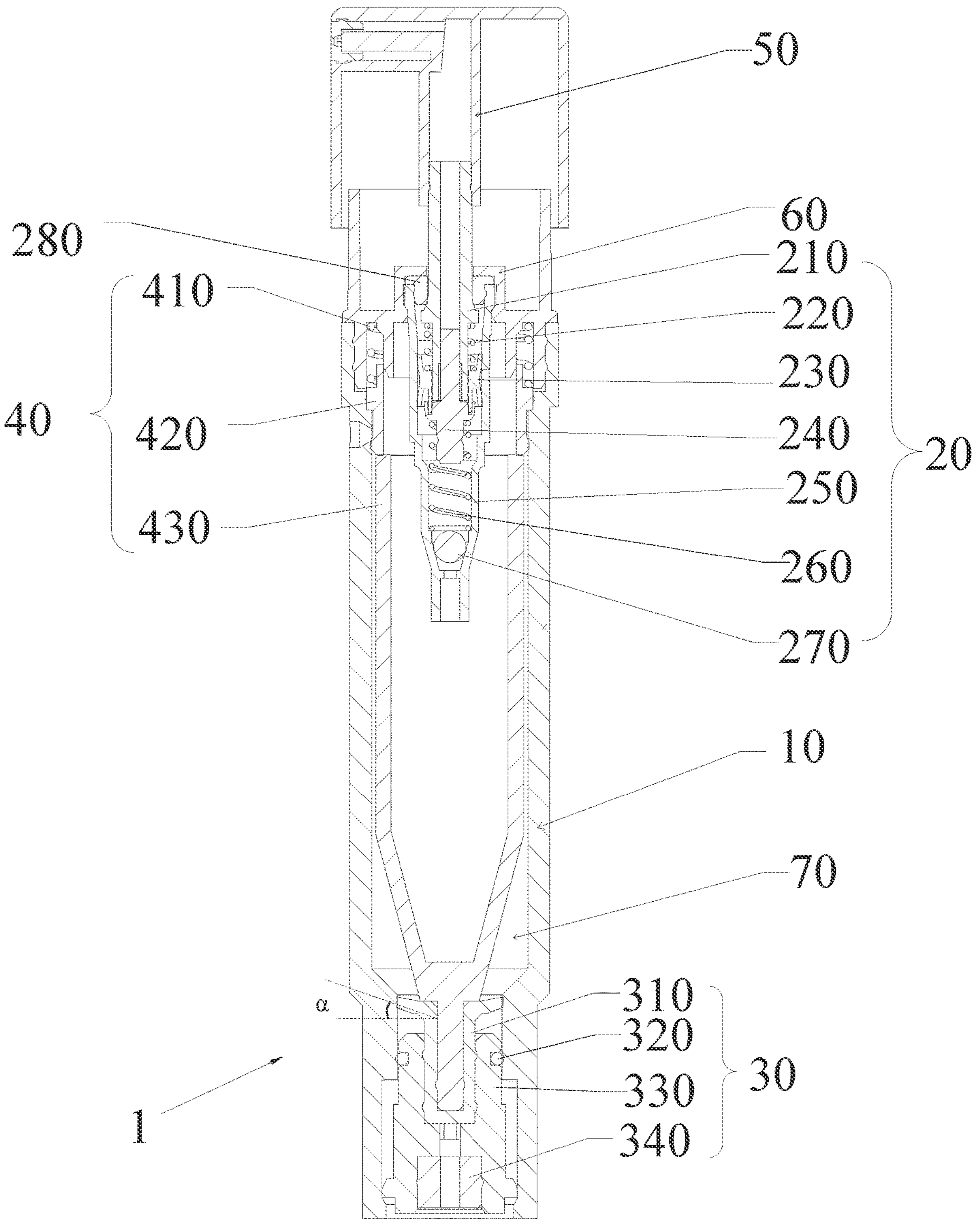
FIG. 1 is a schematic cross-sectional view of a bottom-fillable spray bottle according to Embodiment 1 of the disclosure.
Figure 2:
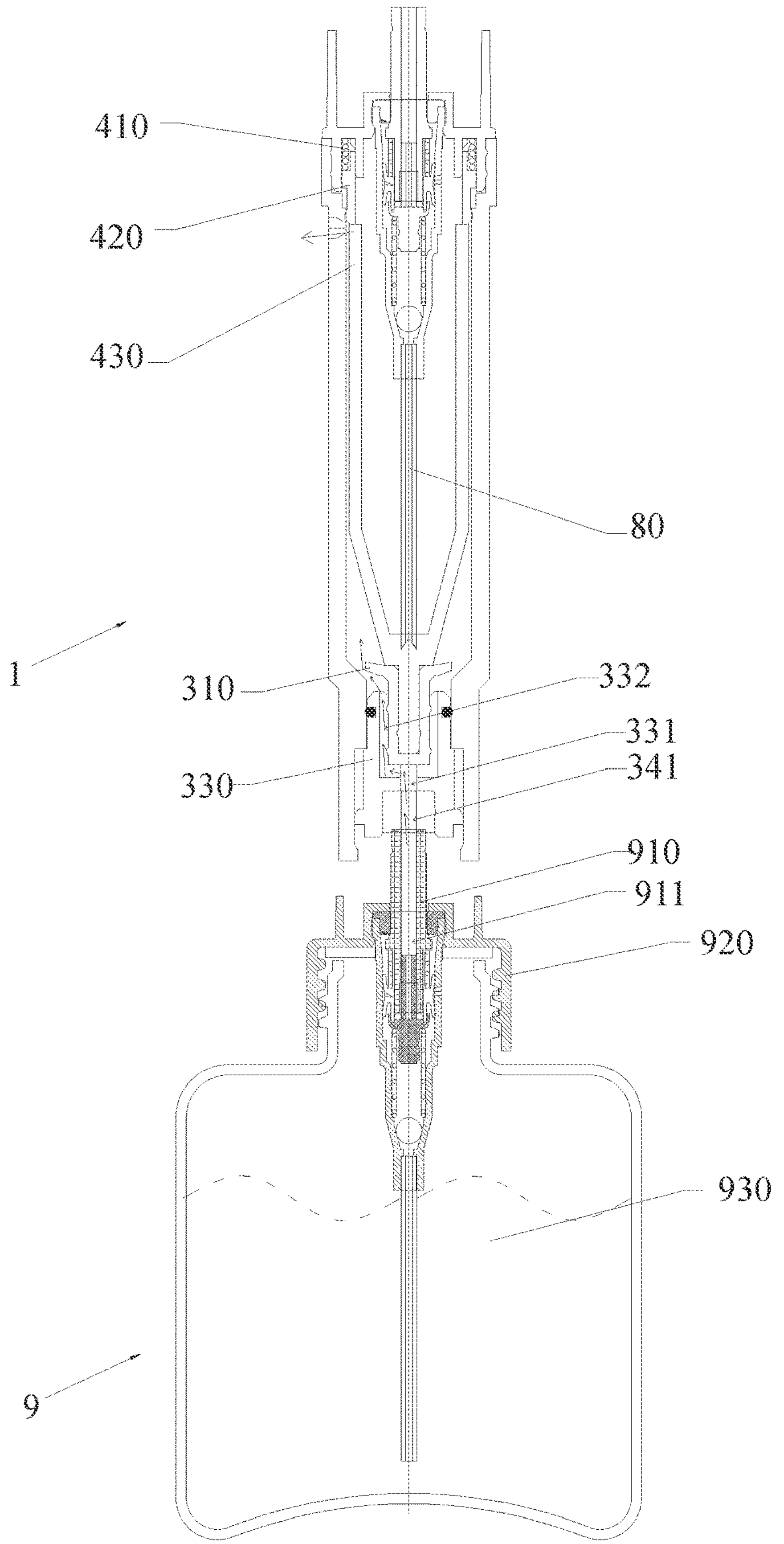
FIG. 2 is a schematic cross-sectional view of a spray bottle in a liquid-adding state according to Embodiment 1 of the disclosure.
Figure 3:
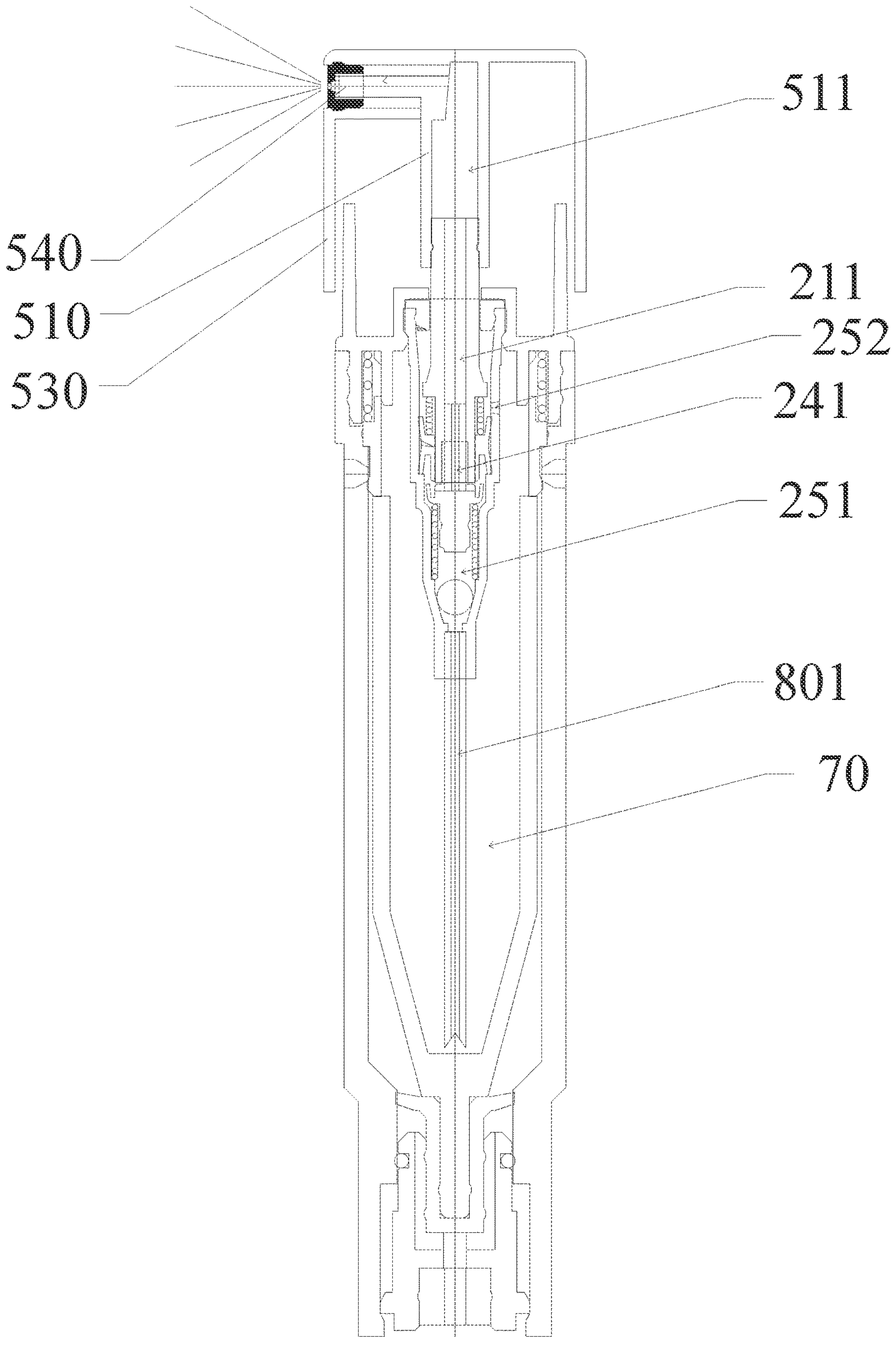
FIG. 3 is a schematic cross-sectional view of a spray bottle in a liquid-spraying state according to Embodiment 1 of the disclosure.
Figure 4:
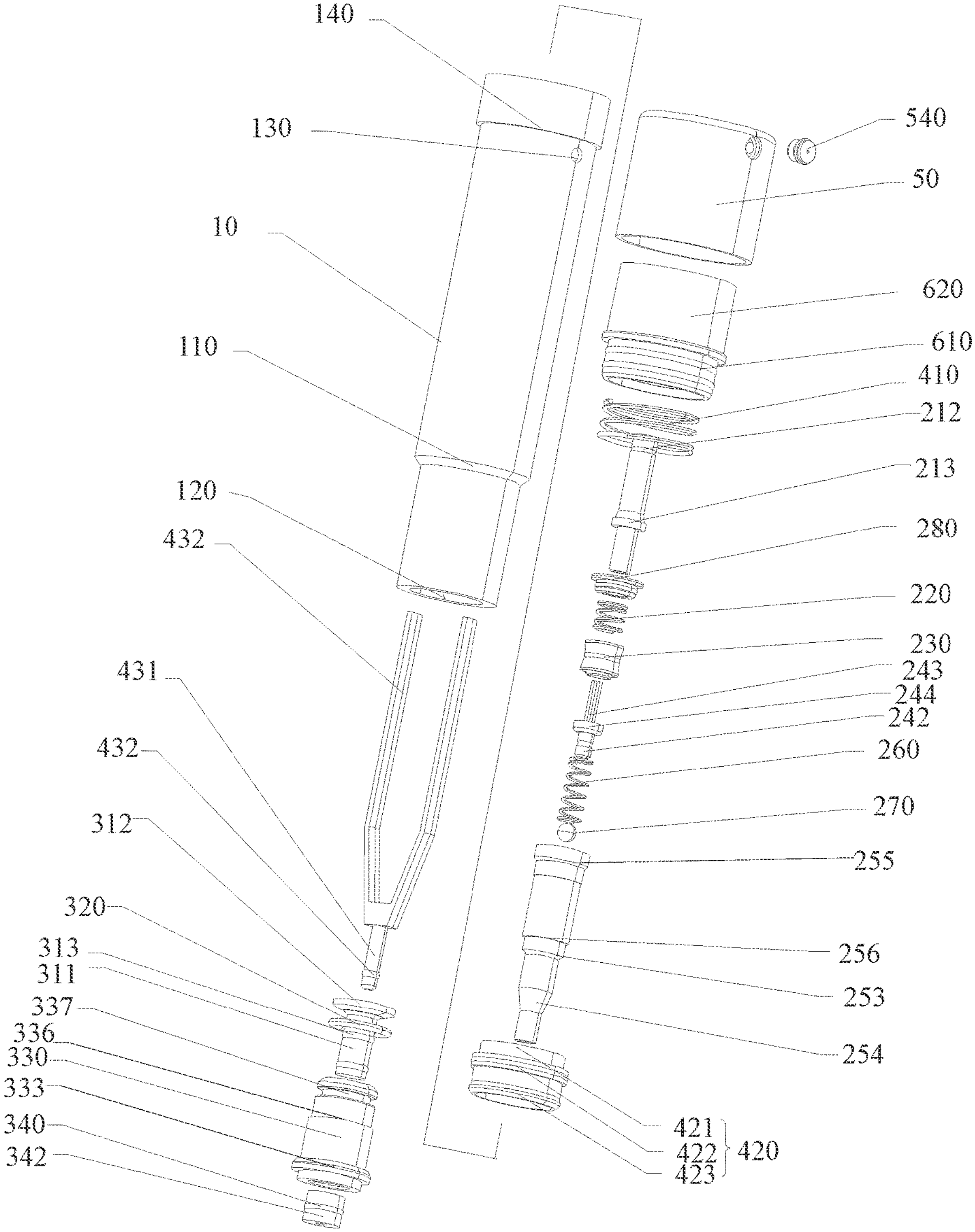
FIG. 4 is an exploded view of a spray bottle according to Embodiment 1 of the disclosure.
Figure 5:
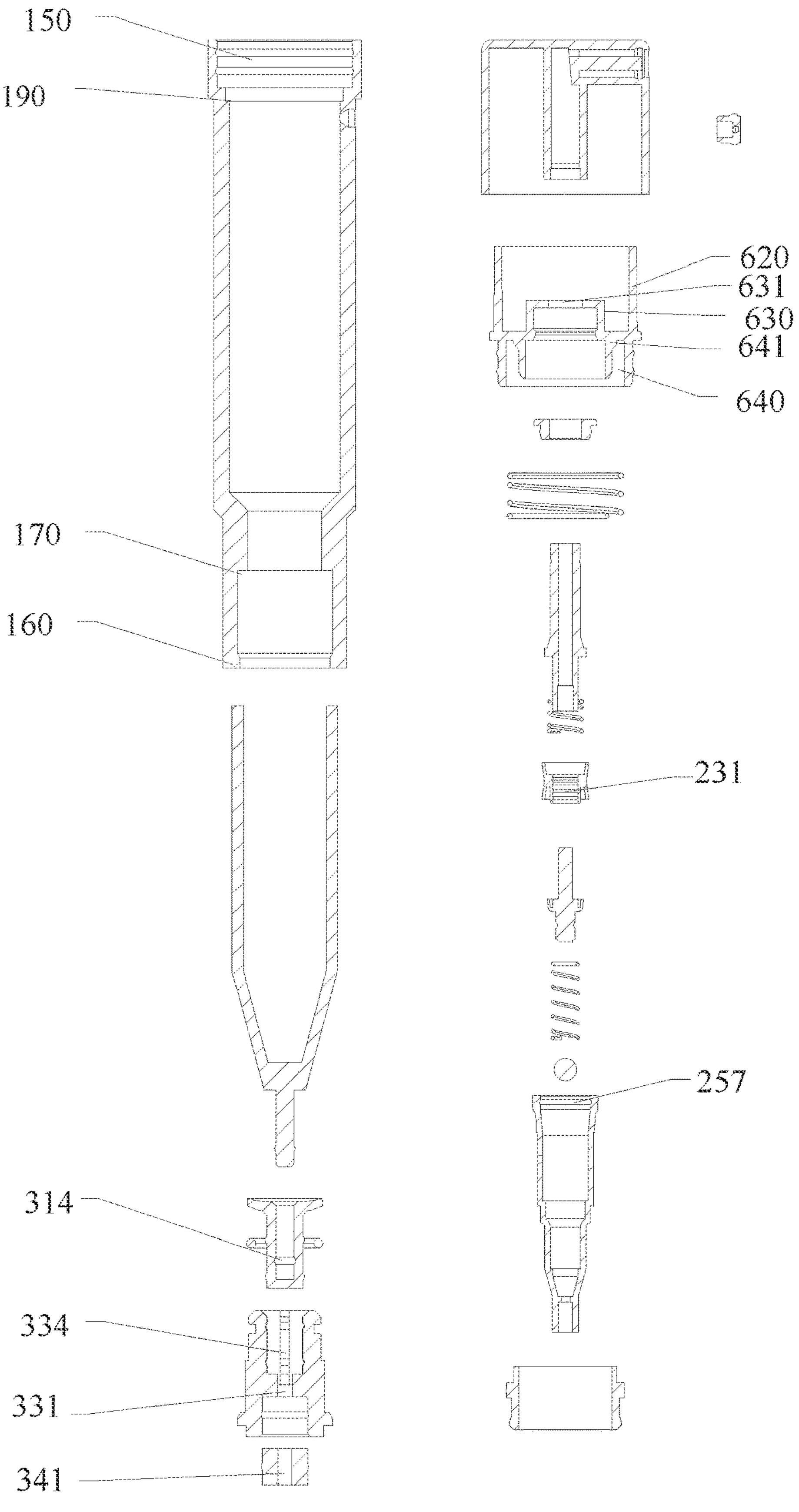
FIG. 5 is an exploded cross-sectional view of a spray bottle according to Embodiment 1 of the disclosure.

Referring to FIGS. 1 to 7, a bottom-fillable spray bottle 1 is provided in this embodiment. FIG. 1 is a schematic cross-sectional view of the spray bottle perpendicular to a central axis of the spray bottle. An arrow inside a structure diagram in FIG. 2 indicates a flow direction of liquid or gas.

The bottom-fillable spray bottle 1 includes a bottle body 10, a liquid spraying assembly 20, a vent assembly 40 and a liquid injection assembly 30 mounted at a bottom of the bottle body 10. An accommodating cavity 70 is provided in the bottle body 10, and the liquid spraying assembly 20 is arranged on the bottle body 10 for realizing liquid spraying of the bottle. The vent assembly 40 includes a vent piston 420, an ejector pin 430 and a first elastic member 410. A vent hole 130 is provided near a top of the bottle body 10. An end of the ejector pin 430 abuts against one end of the vent piston 420, and an end of the first elastic member 410 abuts against the other end of the vent piston 420, so that the vent piston 420 can releasably seal the vent hole. The liquid injection assembly 30 mounted at the bottom of the bottle body 10 includes a liquid injection piston 310 and a bayonet 330, the liquid injection assembly 30 is arranged in the opening 120 at the bottom of the bottle body 10, the liquid injection piston 310 includes a first shoulder to releasably seal the opening, and the bayonet 330 is in sealing fit with an inner wall of the bottom of the bottle body 10. The liquid injection piston 310 is connected with the ejector pin 430, and a bottom of the liquid injection piston 310 is engaged in a groove of the bayonet 330, so that the bayonet 330 can be moved to drive the ejector pin 430 to move. The bayonet 330 is provided with a first liquid inlet channel 332, a liquid inlet nozzle 340 is provided at a bottom of the bayonet 330, and the liquid inlet nozzle 340 has a second liquid inlet channel 341. When the first shoulder is released from the opening, the first liquid inlet channel, the second liquid inlet channel and the accommodating cavity 70 are communicated with each other.

An opening can be provided at the bottom of the bottle body 10, and the liquid injection assembly 30 is arranged at the opening at the bottom. The liquid injection piston 310 of the liquid injection assembly 30 includes a first shoulder 312 and a liquid injection piston head 311, and a groove 314 is provided in the liquid injection piston head 311, and the groove is configured to be matched and connected with the ejector pin 430, and the ejector pin 430 also includes a mounting head 431 for matching with the groove, and the mounting head is engaged in the groove of the liquid injection piston 310.

A second shoulder 110 and the first shoulder 312 of the liquid injection piston 310 are provided at the bottom of the bottle body 10. The first shoulder abuts against a bottom of the second shoulder so as to seal the opening, and the "bottom" here refers to a position on an inner wall of the bottle body 10 near the second shoulder. The first shoulder is in interference fit with the second shoulder thus realizing good sealing effect. In this embodiment, the first shoulder and the second shoulder are both provided with a slop with a different inclination angle. The inclination angles of the first shoulder and the second shoulder are both acute angles, and the inclination angle $\alpha$ of the first shoulder is smaller than that of the second shoulder, so as to increase the sealing performance.

An outer wall of the liquid injection piston head 311 is matched and connected with the groove of the bayonet 330. In order to increase matching strength, a first engaging structure is respectively provided at engaging parts of the bottom of the liquid injection piston 310 and of the groove of the bayonet 330. There are two first engaging structures in this embodiment, but there may be any other number of first engaging structures in other embodiments.

In this embodiment, the ejector pin 330 is integral with a single structure circumferentially arranged around a central axis of the spray bottle. The bayonet 330 includes a first part and a second part. The first part is provided with a groove for accommodating the liquid injection piston head 311, and an inner wall of the groove is axially distributed with a plurality of protrusions 334 extending axially, and a channel is formed between adjacent protrusions. Both the first part and the second part are provided with a through hole 331, so that a channel between the through holes of the first part and the second part and the protrusions forms a first liquid inlet channel.

An annular protrusion 333 and protrusion 160 matched with each other are respectively provided at an outer wall of the second part of the bayonet 330 and the inner wall of the bottom of the bottle body 10, so as to function in limiting. A third shoulder 336 and a fourth shoulder 170 matched with each other are respectively provided at an outer wall of the first part and the inner wall of the bottom of the bottle body 10, and matching of the third shoulder and the fourth shoulder can also function in limiting, so that there are upper limits for both downward movement and upward movement of the bayonet 330. A thickness of a wall of the bottle body 10 from the fourth shoulder to the second shoulder is greater than that of a part of the bottle body 10 below the fourth shoulder, so as to leave room for the annular protrusion on the outer wall of the second part of the bayonet 330 to move.

A second sealing ring 320 is arranged between the outer wall of the first part and the inner wall of the bottom of the bottle body 10 at an end away from a locking structure and the third shoulder, and the second sealing ring and the first part are in interference fit with the bottle body 10, thus further achieving sealing effect. A second sealing ring groove 337 for accommodating the second sealing ring is provided on the outer wall of the first part.

A groove for accommodating the liquid inlet nozzle 340 is provided at a bottom of the second part of the bayonet 330, the liquid inlet nozzle 340 is engaged in the groove. The liquid inlet nozzle 340 and an inner wall of the groove are also provided with a groove and a protrusion 342 matched with each other. The second liquid inlet channel is in the liquid inlet nozzle 340, and a bottom of the liquid inlet nozzle 340 has a matching surface, which is a flat surface and can be suitable for matching with liquid outlet nozzles of most of solution storage bottles of different sizes and shapes.

The vent assembly 40 includes the vent piston 420, the ejector pin 430 and the first elastic member 410. The ejector pin 430 further includes two ejector pin bodies 432, which are connected with the mounting head, and an end each of the two ejector pin bodies 432 abuts against an end of the vent piston 420. In this embodiment, there are two ejector pin bodies 432, but in other embodiments, there may be any other number of ejector pin bodies. Engaging parts of the mounting head and the groove of the liquid injection piston 310 are respectively provided with a circumferential protrusion 432 and a circumferential groove matched with each other, that is, a second engaging structure, so as to increase fixing effect of the ejector pin 430 and the liquid injection piston 310. There is one second engaging structure in this embodiment, but there can be any other number of second engaging structures in other embodiments.

The ejector pin 430 in this embodiment includes two sections, and a section abutting against the vent piston 420 is basically parallel to an axial direction of the bottle body 10. When the ejector pin moves against the vent piston 420, the entire vent piston 420 can be completely moved up, so that no offset angle may be generated for the vent piston 420.

The vent piston 420 includes an insertion part 421 and a blocking part 422. In this embodiment, the vent piston 420 is approximately T-shaped, but in other embodiments, the vent piston 420 can be in other shapes as long as it has the blocking part and the insertion part. The vent piston 420 is integral with a single structure arranged circumferentially around the central axis of the spray bottle. The blocking part of the vent piston 420 is configured to seal the vent hole at a top of the bottle body 10. A lower end of the blocking part is a fifth shoulder of the vent piston 420, and the top of the bottle body 10 is provided with a sixth shoulder 190 matched with the fifth shoulder to limit downward movement of the vent piston 420. An upper end of the blocking part can also be configured to abut against the first elastic member 410.

Figure 7:
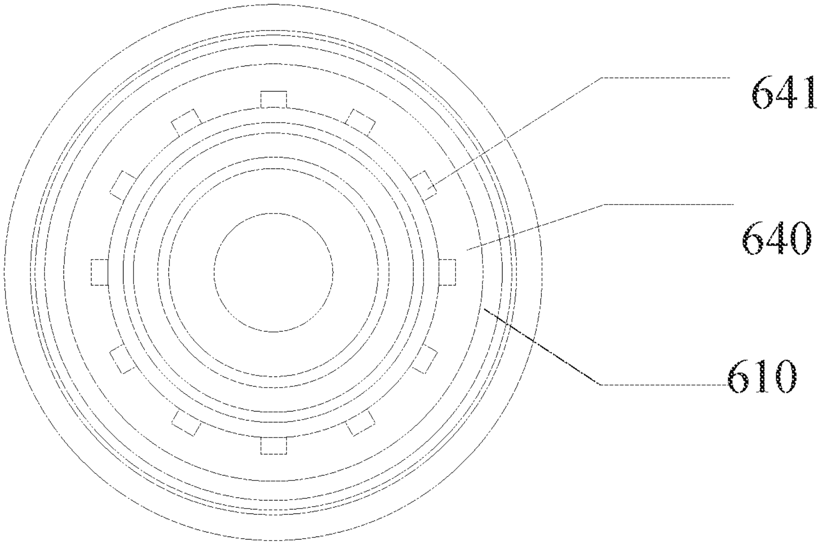
FIG. 7 is a perspective view of a lock cover according to Embodiment 1 of the disclosure.

The bottom-fillable spray bottle further includes a lock cover 60, which is detachably connected with the bottle body 10, such as in a threaded connection, and a threaded part 610 of the lock cover is connected with an internal thread 150 of the bottle body. A groove 640 for accommodating the first elastic member 410 is provided at a bottom of the lock cover 60, and the other end of the first elastic member 410 abuts against an inner wall of the groove of the first elastic member 410. In venting, the vent piston 420 moves upward, thereby compressing the first elastic member 410. When the vent piston 420 loses its upward force, the first elastic member 410 rebounds, thereby pushing the vent piston 420 back to its original position and sealing the vent hole. The insertion part of the vent piston 420 can be inserted into the groove of the first elastic member 410, and the insertion part is arranged at an end of the vent piston 420 near the first elastic member 410. Optionally, in order to further limit a movement process of the spring, a limiting boss 641 for limiting the first elastic member 410 is provided at a side of the bottom of the groove of the first elastic member 410 near a position where the insertion part is inserted. The limit boss may be circumferentially integrally arranged, but in this embodiment, there are a plurality of limit bosses, and the plurality of limit bosses are axially arranged, as shown in FIG. 7.

Optionally, in order to increase an abutting area of the ejector pin 430 and the vent piston 420, the insertion part is enlarged 423 near an end of the ejector pin 430.

Optionally, the liquid spraying assembly 20 includes a pressing cover 50, a first piston rod 210, a spraying piston 230, a second piston rod 240, and a pump body 250. A middle part of the lock cover 60 protrudes upward to form a protruding part 630 for accommodating the pump body 250, and the protruding part has a through hole 631 for the first piston rod 210 to pass through. The pressing cover 50 has a first liquid outlet channel, and the pressing cover 50 includes a nozzle 540 and a post 510 with a hole therein. The nozzle 540 is communicated with the hole 511 of the post to form the first liquid outlet channel, the first piston rod 210 is engaged in the hole of the post to realize linkage between the pressing cover 50 and the first piston rod 210, and the first piston rod is also provided with a groove 212 for matching with a protrusion on a wall of the hole of the post. A mounting cap 280 is also provided between the protruding part and a pump body 250.

A liquid storage chamber 251 is provided in the pump body 250, a connecting part for connecting a suction pipe 80 is provided at a bottom of the pump body 250, a channel 801 is provided in the suction pipe, the connecting part is with an opening, and the pump body further includes a conical part 254 connected with the connecting part, and a ball 270 is provided in the conical part, and the ball 270 releasably seals the opening of the connecting part. A pressure of an upper part of the ball 270 appears as a pressure of the liquid storage chamber, and a pressure of a lower part of the ball 270 appears as a pressure of the accommodating cavity 70 of the spray bottle. Pressure difference between the two pressures serves to control the ball 270 to bounce or fall back, thus resulting sealing or opening of the opening.

Figure 6:
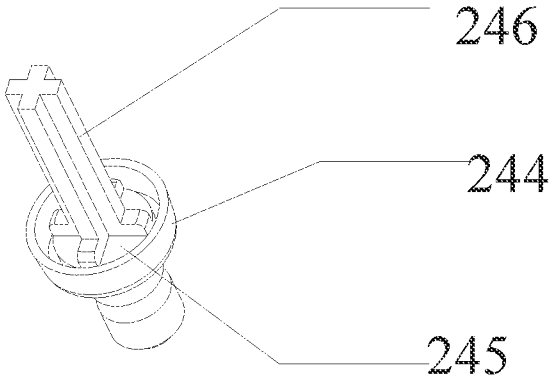
FIG. 6 is a perspective view of a second piston rod according to Embodiment 1 of the disclosure.

A liquid outlet channel 211 is provided in the first piston rod 210. As shown in FIG. 6, the second piston rod 240 includes a first part 243 and a second part 242, between which a protrusion 244 is formed, and protrusions or ridges 246 are axially provided on an outer wall of the first part, and a liquid outlet channel 241 for liquid to pass through is also formed between the protrusions or ridges, so as to communicate with the liquid outlet channel of the first piston rod 210 and thus with the liquid storage chamber of the pump body 250.

The spray piston 230 and a second elastic member 260 are respectively sleeved on the first part and the second part. A lower end of the spray piston 230 and an upper end of the second elastic member 260 abut against the protrusions of the first part and the second part respectively. When the lower end of the spray piston abuts against the protrusion of the first part, the liquid outlet channel 241 can be blocked, and when the lower end of the spray piston leaves the protrusion, the liquid outlet channel can be opened. A third elastic member 220 is arranged between the upper end of the spray piston 230 and a middle expansion part 213 of the first piston rod 210, and the lower end of the second elastic member 260 abuts against upstream of the conical part. The first part is inserted into the liquid outlet channel of the first piston rod 210, so that the first piston rod 210 also partially abuts against a middle projection of the second piston rod 240, leaving a gap 245 for the liquid to flow through, as shown in FIG. 6.

The spray piston 230 is integral with the single structure circumferentially arranged around the central axis of the spray bottle, and has extensions extending upward and downward respectively, so as to be in sliding fit with an inner wall of the pump body 250, and the upward and downward extensions are not completely fit with the inner wall of the pump body 250. In addition to the extensions, the spray piston is further provided with a matching part 231 for matching with the first piston rod and the second piston rod, and the matching part can be in interference fit with the first piston rod and/or the second piston rod so as to realize sealing between the spray piston and the first piston rod and/or the second piston rod.

The spray piston 230 divides inside of the pump body 250 into a liquid storage chamber 251 and an air cavity, the air cavity is located above the liquid storage chamber, and the liquid storage chamber is a relatively sealed structure with only one opening at an outlet. At a position of the air cavity, the pump body 250 is provided with an air outlet port 252 for discharging air. In spraying liquid, middle parts of the extensions extending upward and downward are aligned with the air outlet port 252, and the air outlet port 252 is no longer blocked by the spray piston 230 so that it can serve to discharge air. When the liquid spraying is stopped, the spray piston 230 moves to seal the air outlet port.

When the pressing cover is not pressed, the second elastic element is in a tension expansion state, and at this time, the second elastic element gives an upward force to the second piston rod, and then the first piston rod is also subjected to an upward force, and the first piston rod hold still due to limiting effect of the convex part 630, thus remaining stationary. In order to further increase limiting effect, a mounting cap 280 may be provided between the protruding part 630 and the first piston rod. At this time, the third elastic element is also in a tension expansion state so that the spray piston is subjected to a downward force, providing pressing in an engaging groove of the second piston rod, and thus sealing the liquid channel, and the spray piston and an inner wall of the pump body are always in interference sealing with each other. At this time, the spray piston 230 is just at a position where the air outlet port is sealed.

There is also a gap between the protrusion between the first part and the second part and the inner wall of the pump body 250. When the pressing cover 50 is pressed, the pressing cover 50 drives the first piston rod 210 to move from below, so that the spray piston 230 compresses the third elastic member 220, so that the spray piston 230 moves down, and at the same time, the second piston rod 240 moves down, and thus the second elastic member 260 is compressed, and a space in the liquid storage chamber of the pump body 250 is compressed. Due to a high pressure in the liquid storage chamber at this time, the ball 270 falls back and the outlet is blocked. When an upward force from the pressure in the liquid storage chamber on the spray piston is greater than a downward force from the third elastic member on the spray piston, the spray piston moves upward to open a seal with the second piston rod, and liquid inside can only enter the liquid outlet channel between axial protrusions on the outer wall of the first part from a gap between the protrusion and the inner wall of the pump body 250, thus entering the liquid outlet channel of the first piston rod 210 and finally being ejected from the nozzle 540. After the pressing cover 50 continues to press down, the spray piston is limited by a limiting structure and spraying stops because it is pressed down to a bottom. Meanwhile, there are other flows into the pump body through the liquid outlet channel. At this time, the middle parts of the extensions extending upward and downward are aligned with the air outlet port 252, and gas entering the pump body can enter the accommodating cavity of the bottle body through the gas outlet port, so as to balance a negative pressure in the bottle caused by liquid spraying.

When the pressing force is removed, both the third spring and the second spring rebound, and the second spring pushes the second piston rod 240 to move upward, and the second piston rod 240 further pushes the spray piston 230 to move upward, and a rebound force of the third elastic member acts on the spray piston, so that the spray piston moves relatively downward into an annular groove of the second piston rod to form pressing sealing. The spray piston and the second piston rod continue to move upwards, which leads to formation of a negative pressure in the liquid storage chamber, and the negative pressure in the liquid storage chamber causes the ball to jump upwards. A liquid valve opened by the ball causes the liquid in the accommodating cavity to enter the liquid storage chamber of the pump body until dynamic balance is reached. The first piston rod, the second piston rod and the spray piston rebound to a limit position of a lock cover at the top, and all fittings are restored to a free state and a sealed state.

The bottle body 10 is provided with a seventh shoulder 253 matched with a middle part of the second piston rod 240, and the seventh shoulder is arc-shaped, so that the gap between the protrusion in the middle part of the second piston rod 240 and the inner wall of the pump body 250 can be facilitated. In order to limit further downward movement of the spray piston 230, the bottle body 10 is further provided with an eighth shoulder 256. The outer wall of the bottle body 10 is further provided with a ninth shoulder 255, which facilitates taking and placing or facilitating matching with an outermost outer cover, and the outer cover can surround the whole spray bottle.

Except for the ejector pin body 432 and a few small components such as the nozzle 540, basic components are integral with a single structure circumferentially arranged around the central axis of the spray bottle. An expression "circumferentially arranged" can refer to annular, rectangular, triangular and polygonal arrangement.

The lock cover 60 includes an outer wall 620 extending away from the bottle body 10, and the outer wall of the lock cover 60 is internally arranged within a side wall 530 of the pressing cover 50.

In other implementations, the liquid spraying assembly 20 can also be any other structure that can realize a liquid spraying function, which is not limited herein.

The solution storage bottle 9 in this embodiment includes a bottle body 930, a cover 920, a liquid outlet nozzle 910 and a liquid spraying assembly 911. The bottle body 930 is configured for storing liquid, and the liquid spraying assembly 911 is configured for discharging liquid from inside of the bottle body 930. Once the liquid outlet nozzle 910 is pressed, the liquid can be discharged, thus entering the spray bottle.

Although a structure of the solution storage bottle 9 mentioned in this embodiment is as shown above, any solution storage bottle 9 with the liquid outlet nozzle 910 can be used together with the spray bottle in this application, and a structure of the solution storage bottle 9 is not limited in this disclosure. The liquid spraying assembly 911 of the solution storage bottle 9 may have a structure same as or different from a nozzle 540 assembly of the spray bottle.

Embodiment 2

The vent assembly 40 according to Embodiment 1 has a complicated structure, which includes the vent piston 420, the ejector pin 430 and the first elastic member 410. Its operating principle is that an end of the ejector pin 430 abuts against one end of the vent piston 420, and an end of the first elastic member 410 abuts against the other end of the vent piston 420, so that the vent piston 420 can releasably seal the vent hole 130 of the bottle body 10. However, the vent assembly 40 with this structure makes it easy for one end of the ejector pin 430 to slip off from one end of the vent piston

420, thus affecting using. Moreover, with only the vent piston 420 blocking and sealing the vent hole 130, sealing performance needs to be improved.

In order to overcome at least one of above problems, as shown in FIGS. 8 to 12, another bottom-fillable spray bottle 1' is provided in Embodiment 2. The bottom-fillable spray bottle 1' is basically the same as the bottom-fillable spray bottle 1 provided in Embodiment 2 in shape and structure, and same reference numerals are used for parts with same structures and shapes, which will not be repeatedly described here, and only differences are described below.

In Embodiment 2, a vent assembly 40' with another structure is adopted. The vent assembly 40' does not have a vent piston. The vent assembly 40' of this embodiment includes a first sealing ring 440', an ejector pin 430' and a first elastic member 410'. A vent hole 130 is provided at a position near a top of a bottle body. A first sealing ring 410' for interference fit is arranged between the ejector pin and the bottle body, and an end of the ejector pin abuts against one end of the first elastic member, so that the first sealing ring can releasably seal the vent hole.

In order to further increase stability of the ejector pin 430' in this embodiment, the ejector pin 430' may be integral with a single structure circumferentially arranged around the central axis of the spray bottle. An expression "circumferentially arranged" can refer to annular, rectangular, triangular and polygonal arrangement. In other embodiments, the ejector pin may not be arranged circumferentially, and a structure with several rods in Embodiment 1 may be adopted. In order to prevent the ejector pin 430' arranged circumferentially from dividing the accommodating cavity into two parts, a vent groove or vent hole 433' is provided above the ejector pin 430', which can be axially arranged, and its number can be one, two or more. When there are a plurality of vent grooves or vent holes, the air grooves or air holes 433' can be arranged in mirror symmetry, and in this embodiment, there are two vent grooves symmetrically.

The ejector pin 430' includes an ejector pin body 432' and a mounting head 431'. The ejector pin body 432' is connected with the mounting head and can be integrally formed. An end of the ejector pin body 432' is radially provided with a groove 434' to accommodate the first sealing ring 440' so that the first sealing ring is in interference fit with the bottle body and the ejector pin respectively. A second groove 435' for accommodating the first elastic member 410' is further provided at an upper end of the ejector pin body 432', so that an end of the ejector pin abuts against an end of the first elastic member. The bottom-fillable spray bottle further includes a lock 60', and the other end of the spring abuts against a lower end of a lock cover 60'. In this embodiment, there is only one groove 434' and one first sealing ring 440', but in other embodiments, there can be two grooves 434' and two first sealing ring 440', and the two grooves 434' are arranged side by side at one end of the ejector pin body 432', so that the sealing ring can achieve the sealing effect without being particularly thick, and at the same time, the rebound effect can be increased.

The lock cover 60' is detachably connected with the bottle body 10', such as in a threaded connection similar to that in Embodiment 1. A first groove 640' for accommodating the first elastic member 410' is provided at a bottom of the lock cover 60', and a second groove 435' for accommodating the first elastic member 410' is further provided at an end of the ejector pin body 432' and the first elastic member 410' is limited by the first groove 640' and the second groove 435'.

In venting, the first sealing ring 440' is driven by the ejector pin to move upward, thereby compressing the first elastic member 410' and exposing the vent hole 130. When the first sealing ring 440' loses its upward force, the first elastic member 410' rebounds, thus pushing the ejector pin to bring the first sealing ring 440' back to its original position and seal the vent hole. In order to prevent the ejector pin along with the first sealing ring from further moving downwards, the bottle body is provided with a shoulder 190' matched with a protrusion of the ejector pin at a lower side of the vent hole.

Figure 11:
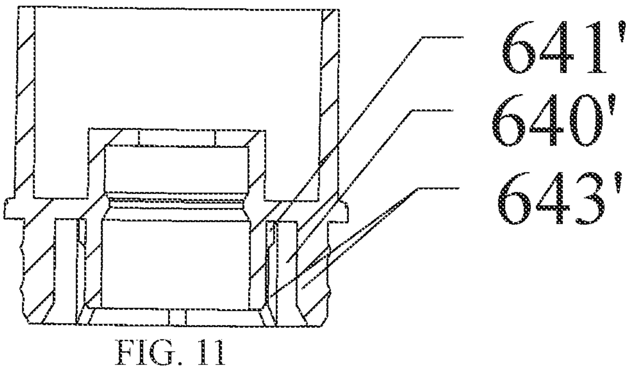
FIG. 11 is a cross-sectional view of a lock cover according to Embodiment 2 of the disclosure.
Figure 12:
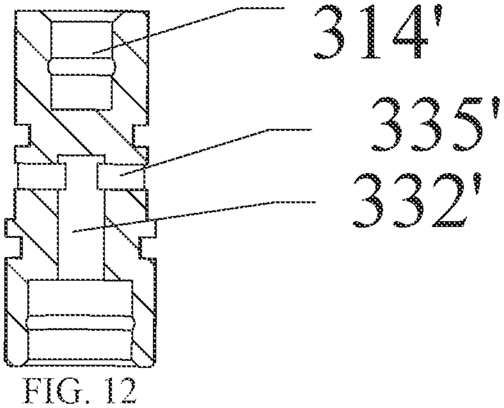
FIG. 12 is a cross-sectional view of a bayonet according to Embodiment 2 of the disclosure.
Figure 13:
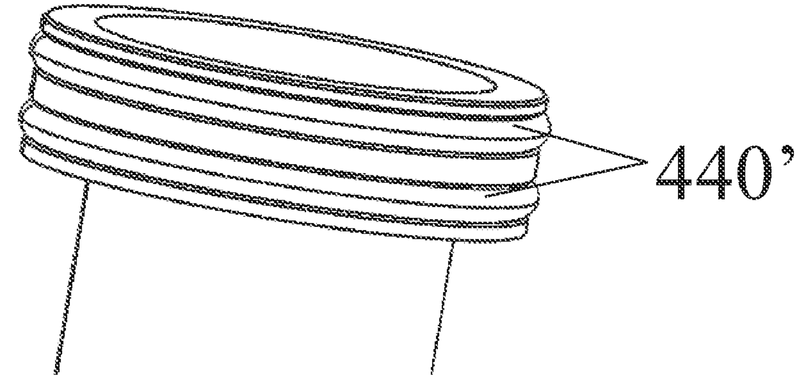
FIG. 13 is a view of two first sealing rings according to Embodiment 2 of the disclosure.

Optionally, in order to further limit a movement process of the first elastic member 410', as shown in FIG. 11, a limiting boss 641' and rib 643' are provided at two opposite sides of a bottom of the first groove 640' for limiting at the two opposite sides of the first elastic member 410'. The limiting boss 641' may be shorter than the rib 643', and the limiting boss 641' is closer to a central axis of the spray bottle than the rib 643'. The limiting boss 641' and the rib 643' may be circumferentially and integrally arranged, but in this embodiment, there are a plurality of limiting bosses 641' and a plurality of ribs 643', and the plurality of limit bosses are axially arranged on inner walls of the opposite sides of the groove.

Figure 9:
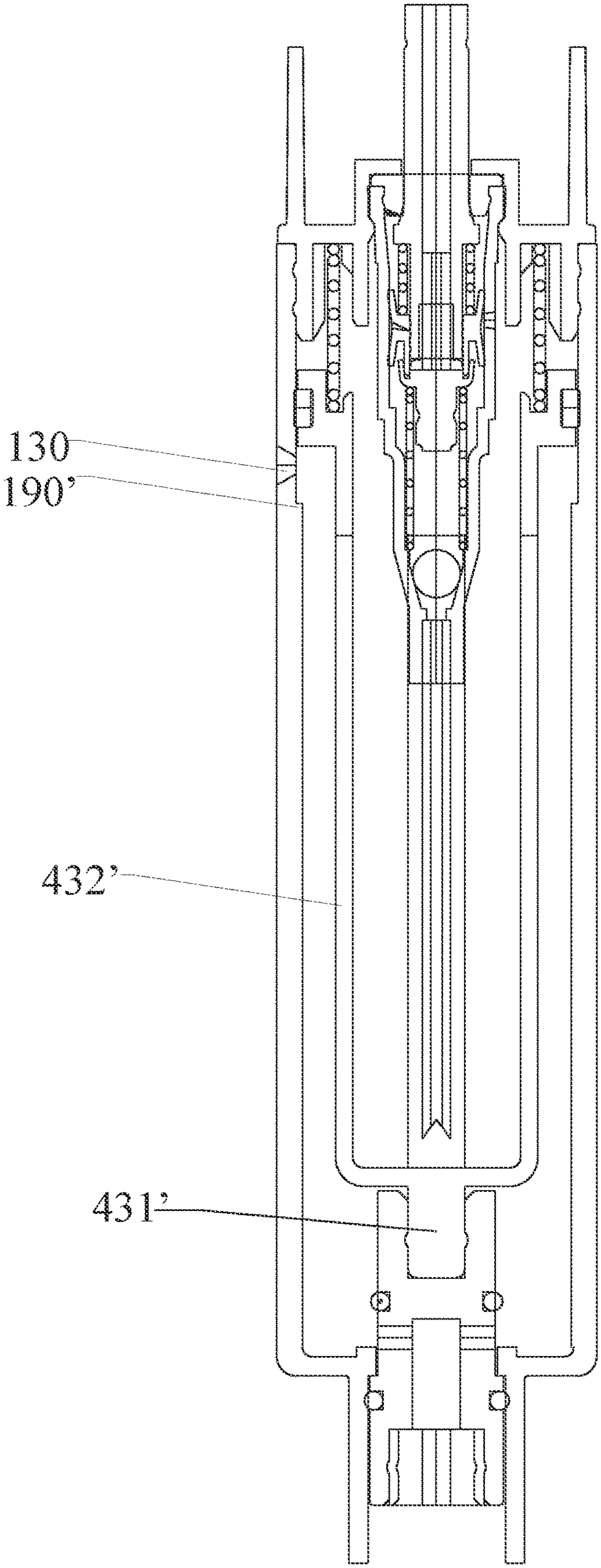
FIG. 9 is a schematic cross-sectional view of a spray bottle in a liquid-adding state according to Embodiment 2 of the disclosure.
Figure 10:
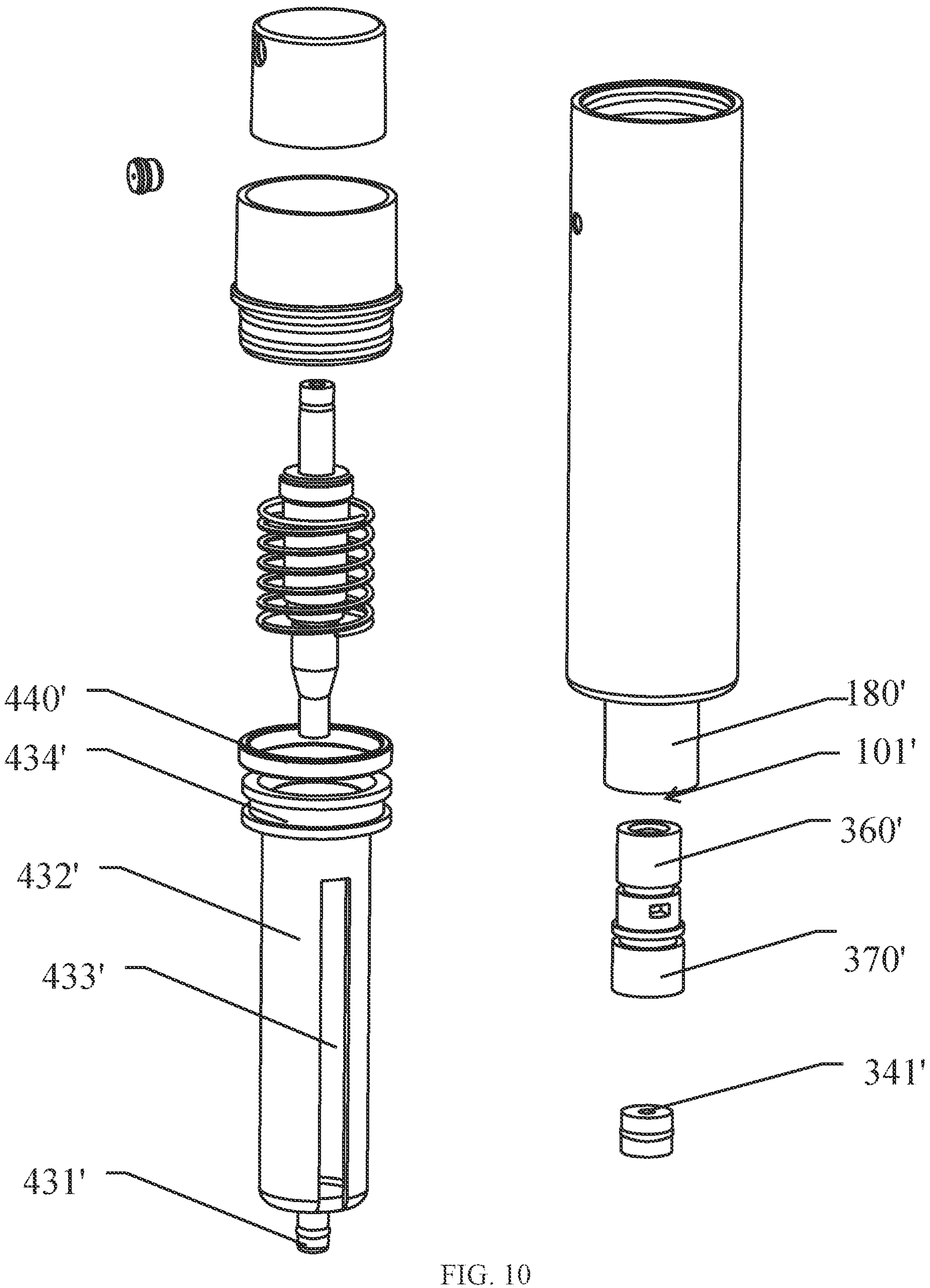
FIG. 10 is an exploded view of a spray bottle according to Embodiment 2 of the disclosure.

As an option, the liquid injection assembly 30' in this embodiment is also different from that in Embodiment 1, which is not defined here. The liquid injection assemblies in Embodiments 1 and 2 can be replaced according to use requirements. The liquid injection assembly is not provided with the liquid injection piston 310, and the liquid injection assembly 30' includes a liquid inlet nozzle 340' and a bayonet 310', and a structure of the bayonet has been further modified, and the liquid inlet nozzle 340' can adopt a same structure as that in Embodiment 1. The liquid injection assembly 30' is arranged at an opening 101' at the bottom of the bottle body, and the bayonet can releasably seal the opening. The bayonet is provided with a first liquid inlet channel 332', the liquid inlet nozzle is provided at a bottom of the bayonet, the liquid inlet nozzle is provided with a second liquid inlet channel 341', and the bayonet is provided with a third liquid inlet channel 335' communicated with the first liquid inlet channel. When the liquid inlet nozzle pushes the bayonet into the opening so that the liquid inlet nozzle is released from the opening, as shown in FIG. 9, the first liquid inlet channel, the second liquid inlet channel, the third liquid inlet channel and the accommodating cavity are communicated with each other, but when the opening is sealed by the bayonet, the third liquid inlet channel and the accommodating cavity are not communicated with each other. The bayonet is in sealing fit with the inner wall of the bottom 180' of the bottle body. The bayonet is connected with the other end of the ejector pin, so that movement of the bayonet drives the ejector pin to move, and in this embodiment, the bayonet is connected with the mounting head of the ejector pin.

Optionally, engaging parts of the mounting head and the groove 314' of the bayonet are respectively provided with a circumferential protrusion and a circumferential groove matched with each other, that is, engaging structures, so as to increase the fixing effect of the ejector pin and the bayonet. There is one engaging structure in this embodiment, but there can be any other number in other embodiments. In other embodiments, the engaging structures can be convex and concave, convex and convex, concave and concave structures which cooperate with each other.

The bayonet 310' in this embodiment is integral with a single structure circumferentially arranged around the central axis of the spray bottle, and an expression "circumferentially arranged" can refer to annular, rectangular, triangular and polygonal arrangement. The bayonet 310' includes a first part 360' and a second part 370'. The first part and the second part are bounded by a second sealing ring 320'. The first part is provided with a groove 314' for accommodating the mounting head 431', and mutually matched engaging structures are provided at the mounting head 431' and the groove of the pin 310'. Optionally, in this embodiment, a shoulder 336' and a shoulder 170' matched with each other are respectively provided at an outer wall of the bayonet 310' and an inner wall of the bottom of the bottle body, and the shoulder 336' and the shoulder 170' can also function in limiting, so that there's an upper limit for upward movement of the bayonet. In Embodiment 1, the annular protrusion 333 and protrusion 160 matched with each other are respectively provided at the outer wall of the second part of the bayonet 330 and the inner wall of the bottom of the bottle body 10, so as to function in limiting. In this embodiment, the bayonet 310' and the bottle body 10' need not be provided with the annular protrusion 333 and the protrusion 160 as in Embodiment 1. A thickness of a bottom 180' of the bottle body 10' at the opening of this embodiment can be uniform.

A second sealing ring 320' and a third sealing ring 330' are arranged between the outer wall of the bayonet 310' and the inner wall of the bottom of the bottle body 10, and the second sealing ring 320' and the third sealing ring 330' are in interference fit with the bayonet 310' and the bottle body 10, respectively, thus further achieving sealing effect. A second sealing ring groove for accommodating a second sealing ring is provided at an outer wall of an intersection of the first part and the second part, and a third sealing ring groove for accommodating the third sealing ring is provided on the outer wall below the shoulder 336'. The first liquid inlet channel and the second liquid inlet channel are both axially arranged, the third liquid inlet channel is radially arranged, and the third liquid inlet channel is arranged between the second sealing ring 320' and the third sealing ring 330'. In this embodiment, there are two third liquid inlet channels, which are respectively arranged on opposite sides of the first liquid inlet channel. Unlike the first part and the second part in Embodiment 1, which are both provided with through holes 331, there is no through hole between the first part and the second part in this embodiment.

Figure 8:
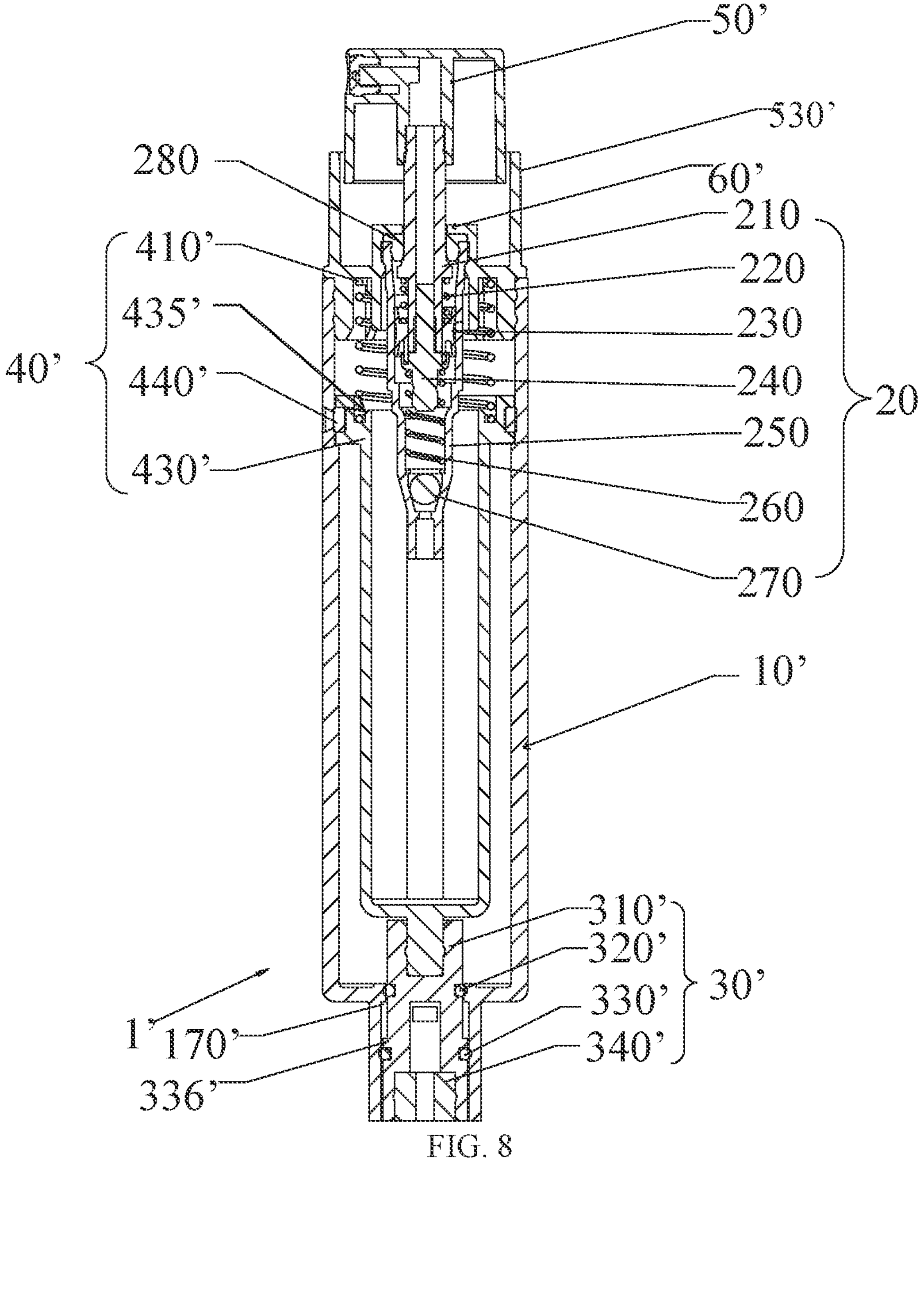
FIG. 8 is a schematic cross-sectional view of a bottom-fillable spray bottle according to Embodiment 2 of the disclosure.

As shown in FIG. 8, when the bottle is in a normal state (non-liquid-injecting state), the second sealing ring 320' is right located at the opening at a junction of the bottle and the bottle bottom to seal the opening. Due to presence of the shoulder 170', an aperture at the junction of the bottle and the bottle bottom is smaller than that at the opening of the bottle bottom 180', so that there's closer interference seal between the second sealing ring and the bottle body. At this time, the third sealing ring 330' is also in interference fit with the bottle body 10 to form a second sealing barrier. When in a liquid injecting state, as shown in FIG. 9, the liquid inlet nozzle 340' pushes the bayonet 310' to move upwards, and the bayonet can be further linked with the ejector pin, and can push the ejector pin to move, and in turn, the ejector pin can push the bayonet to move. The second sealing ring 320' leaves the opening and enters the accommodating cavity of the bottle body. When the third liquid inlet channel 335' also enters the accommodating cavity of the bottle body and communicates with the accommodating cavity, the first liquid inlet channel, the second liquid inlet channel, the third liquid inlet channel and the accommodating cavity are communicated with each other to form a liquid inlet channel. At this time, the third sealing ring 330' is always in an interference fit and sealing state with the inner wall of the bottle bottom of the bottle body 10. In this embodiment, the shoulder 336' of the bayonet 310' is optimally provided just to completely expose the third liquid inlet channel 335'.

A groove for accommodating the liquid inlet nozzle 340' is provided at a bottom of the second part of the bayonet 310', the liquid inlet nozzle 340' is engaged in the groove. The liquid inlet nozzle 340' and an inner wall of the groove are also provided with a groove and a protrusion matched with each other. The second liquid inlet channel is in the liquid inlet nozzle 340', and a bottom of the liquid inlet nozzle 340' has a matching surface, which is a flat surface and can be suitable for matching with liquid outlet nozzles of most of solution storage bottles of different sizes and shapes.

In this embodiment, the second shoulder 110 may not be provided at the bottom of the bottle body 10'.

In this embodiment, the outer wall of the lock cover 60' is internally arranged outside a side wall 530 of the pressing cover 50'.

The liquid spraying assembly can adopt any market structure, and can also adopt that of the liquid spraying assembly as described in Embodiment 1.

Figure 14:
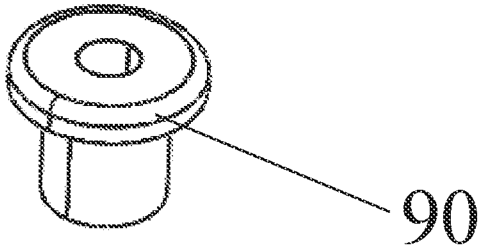
FIG. 14 is a first view of a blocking member according to Embodiment 2 of the disclosure.
Figure 15:
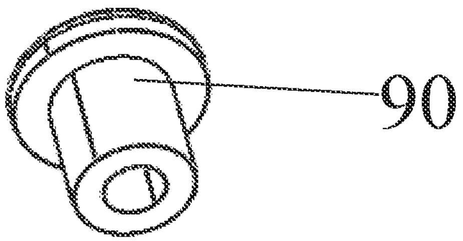
FIG. 15 is a second view of the blocking member according to Embodiment 2 of the disclosure.

In order to prevent the silica gel part of the solution storage bottle 9 from being pushed into the first liquid inlet channel 332', a blocking member 90 as shown in FIGS. 14 and 15 can be arranged at the groove for accommodating the liquid inlet nozzle 340'. The blocking member can be T-shaped, and there is a channel through which the gas supply liquid passes, and an aperture of the channel is smaller than that of the third liquid inlet channel 335' of the bayonet 310', and the blocking member is just clamped to accommodate the liquid inlet nozzle 340, a shape of the liquid inlet nozzle 340' can be determined according to a gap between the sealing piece and the groove for accommodating the sealing piece.

It should be understood by those skilled in the art that in the disclosure of the disclosure, the orientation or positional relationship indicated by the terms "upper", "lower", "front", "rear", "left", "right", "vertical", "horizontal", "top", "bottom", "inner" and "outer" or the like are based on the orientation or positional relationship shown in the drawings, which are only for convenience of describing the disclosure and for simplifying the description, but do not indicate or imply that the indicated device or element must have a specific orientation, be constructed and operate in a specific orientation; therefore the above-mentioned terms cannot be understood as limitations to the disclosure.

Although the disclosure has been disclosed by the preferred embodiment in the above, it is not intended to limit the disclosure and any person familiar with the art can make some changes and embellishments without departing from the spirit and scope of the disclosure; therefore, the scope of protection of the disclosure should be subject to the scope of protection as claimed in the claims.

What is claimed is:

1. A bottom-fillable spray bottle, comprising:

a bottle body with an accommodating cavity provided therein;

a liquid spraying assembly provided on the bottle body for realizing liquid spraying of the spray bottle;

a vent assembly comprising a first sealing ring, an ejector pin and a first elastic member, a vent hole being provided near a top of the bottle body, and the first sealing ring for interference fit being arranged between the ejector pin and the bottle body; and a liquid injection assembly mounted at a bottom of the bottle body, comprising a liquid inlet nozzle and a bayonet, wherein the liquid injection assembly is arranged at an opening at the bottom of the bottle body, and the bayonet releasably seals the opening, the bayonet is provided with a first liquid inlet channel, the liquid inlet nozzle is arranged at a bottom of the bayonet, the liquid inlet nozzle is provided with a second liquid inlet channel, and the bayonet is provided with a third liquid inlet channel communicated with the first liquid inlet channel; when the liquid inlet nozzle pushes a part of the bayonet into the opening so that the third liquid inlet channel enters the opening and enables the third liquid inlet channel to be above the opening, the first liquid inlet channel, the second liquid inlet channel, the third liquid inlet channel and the accommodating cavity are communicated with each other, and when the bayonet seals the opening, the third liquid inlet channel and the accommodating cavity are not communicated with each other; and the bayonet is in sealing fit with an inner wall of the bottom of the bottle body;

wherein one end of the ejector pin is provided with the first elastic member, and the bayonet is connected with the other end of the ejector pin, so that movement of the bayonet drives the ejector pin to move, and thus the ejector pin with a first sealing ring releasably seals the vent hole.

2. The bottom-fillable spray bottle according to claim 1, wherein the bayonet comprises a first part and a second part, a second sealing ring groove for accommodating a second sealing ring being provided at an outer wall of an intersection of the first part and the second part; when the spray bottle is in a non-liquid-injecting state, the second sealing ring is in interference fit with the bayonet and the bottle body respectively; and when the spray bottle is in a liquid-injecting state, the liquid inlet nozzle pushes the bayonet into the opening so that the second sealing ring is not in contact with an inner wall of the bottle body.

3. The bottom-fillable spray bottle according to claim 2, wherein a third sealing ring groove for accommodating a third sealing ring is provided at an outer wall of the second part, and the third sealing ring is in interference fit with the bayonet and the bottle body respectively.

4. The bottom-fillable spray bottle according to claim 3, wherein shoulders matched with each other are respectively provided at an outer wall of the bayonet and the inner wall of the bottom of the bottle body, so that upward movement of the bayonet is limited, and the third sealing ring groove is arranged at a position lower than the shoulders.

5. The bottom-fillable spray bottle according to claim 3, wherein the first liquid inlet channel and the second liquid inlet channel are both axially arranged, the third liquid inlet channel is radially arranged, and the third liquid inlet channel is arranged between the second sealing ring and the third sealing ring; when the spray bottle is in the liquid-injecting state, the third liquid inlet channel is above the opening, so that the third liquid inlet channel is communicated with the accommodating cavity.

6. The bottom-fillable spray bottle according to any one of claim 1, wherein the ejector pin is integral with a single structure circumferentially arranged around a central axis of the spray bottle, and the ejector pin is provided with a vent groove or a vent hole.

7. The bottom-fillable spray bottle according to claim 6, wherein the ejector pin comprises an ejector pin body, there are a plurality of the first sealing rings, and a plurality of grooves for accommodating the plurality of first sealing rings are radially and sequentially provided at an end of the ejector pin body respectively, so that the first sealing ring is in interference fit with the bottle body and the ejector pin respectively.

8. The bottom-fillable spray bottle according to claim 7, wherein a second groove for accommodating the first elastic member is provided at an upper end of the ejector pin body, so that an end of the ejector pin abuts against an end of the first elastic member; the bottom-fillable spray bottle further comprises a lock cover, and the other end of the first elastic member abuts against a lower end of a lock cover.

9. The bottom-fillable spray bottle according to claim 8, wherein a first groove for accommodating the first elastic member is provided at a bottom of the lock cover, and a limiting boss and rib are provided at two opposite sides of a bottom of the first groove for limiting at the two opposite sides of the first elastic member.

10. The bottom-fillable spray bottle according to claim 7, wherein the ejector pin further comprises a mounting head, the ejector pin body being connected with the mounting head, and the bayonet being connected with the mounting head of the ejector pin, the bayonet being provided with a groove for accommodating the mounting head, and mutually matched engaging structures being respectively provided at engaging parts of the mounting head and the groove of the bayonet.

* * * * *